(12) United States Patent
Keohane et al.

(10) Patent No.: US 9,098,625 B2
(45) Date of Patent: Aug. 4, 2015

(54) VIRAL TRACE

(75) Inventors: Susann M. Keohane, Austin, TX (US);
Gerald F. McBrearty, Austin, TX (US);
Shawn P. Mullen, Buda, TX (US);
Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2289 days.

(21) Appl. No.: 12/039,781

(22) Filed: Feb. 29, 2008

(65) Prior Publication Data

US 2009/0222796 A1 Sep. 3, 2009

(51) Int. Cl.
*G06F 9/44* (2006.01)
*G06F 11/36* (2006.01)

(52) U.S. Cl.
CPC .................................. *G06F 11/3636* (2013.01)

(58) Field of Classification Search
CPC .................................................. G06F 11/3636
USPC ........... 717/101–178; 709/223, 230; 718/102, 718/108; 714/30, 38.14, 45; 370/503; 710/15, 260, 310; 711/135; 712/228; 719/318
See application file for complete search history.

(56) References Cited

U.S. PATENT DOCUMENTS

| | | | | |
|---|---|---|---|---|
| 5,751,942 A | * | 5/1998 | Christensen et al. | 714/38.13 |
| 6,052,708 A | * | 4/2000 | Flynn et al. | 718/108 |
| 6,282,701 B1 | | 8/2001 | Wygodny et al. | |
| 6,314,530 B1 | * | 11/2001 | Mann | 714/38.11 |
| 6,367,036 B1 | * | 4/2002 | Hansen | 714/45 |
| 6,513,155 B1 | * | 1/2003 | Alexander et al. | 717/124 |
| 6,553,564 B1 | * | 4/2003 | Alexander et al. | 717/128 |
| 6,625,804 B1 | * | 9/2003 | Ringseth et al. | 717/114 |
| 6,662,358 B1 | * | 12/2003 | Berry et al. | 717/128 |
| 6,678,883 B1 | * | 1/2004 | Berry et al. | 717/128 |
| 6,735,758 B1 | * | 5/2004 | Berry et al. | 717/130 |
| 6,785,883 B1 | | 8/2004 | Slomak | |

(Continued)

OTHER PUBLICATIONS

Framework for Instruction-level Tracing and Analysis of Program Executions—Sanjay Bhansali, Wen-Ke Chen, Stuart de Jong, Andrew Edwards, Ron Murray,Milenko Drini'c, Darek Mihoˇ cka, Joe Chau—Microsoft Corporation, One Microsoft Way, Redmond, WA—VEE'06 Jun. 14-16, 2006, Ottawa, Ontario, Canada.*

(Continued)

*Primary Examiner* — Lewis A Bullock, Jr.
*Assistant Examiner* — Francisco Aponte
(74) *Attorney, Agent, or Firm* — Stephen J. Walder, Jr.; Steven L. Bennett (57) ABSTRACT

Tracing of the interaction of third party processes on resources used by a program under trace is performed. A viral tag is associated with the program under trace. When the program "touches" a portion of memory, the memory manager associates the viral tag with the memory locations in this portion of memory. When subsequent processes "touch" the tagged memory locations, they acquire the viral tag and then spread it to other memory locations that these subsequent processes touch. The viral tag may be slightly modified so as to identify it as being based on the original viral tag but having been acquired by another process. Each time the viral tag is spread to another program, the viral tag may be slightly modified to indicate that the viral tag is now associated with another entity although is still associated with the original viral tag.

21 Claims, 6 Drawing Sheets

(56) References Cited

U.S. PATENT DOCUMENTS

| | | | |
|---|---|---|---|
| 6,857,064 B2* | 2/2005 | Smith et al. | 712/244 |
| 7,065,765 B2* | 6/2006 | Cadden et al. | 718/102 |
| 7,093,234 B2* | 8/2006 | Hibbeler et al. | 717/124 |
| 7,120,901 B2* | 10/2006 | Ferri et al. | 717/128 |
| 7,284,153 B2* | 10/2007 | Okbay et al. | 714/30 |
| 7,305,660 B2* | 12/2007 | Ageyev et al. | 717/128 |
| 7,444,499 B2* | 10/2008 | Davis et al. | 712/227 |
| 7,453,910 B1* | 11/2008 | Biberstein et al. | 370/503 |
| 7,562,179 B2* | 7/2009 | Brandt et al. | 711/6 |
| 7,747,985 B2* | 6/2010 | Campbell et al. | 717/127 |
| 7,937,690 B2* | 5/2011 | Casey | 717/128 |
| 7,962,664 B2* | 6/2011 | Gotch et al. | 710/15 |
| 7,984,129 B2* | 7/2011 | Vaught | 709/223 |
| 8,001,428 B2* | 8/2011 | Ashfield et al. | 714/45 |
| 8,095,921 B2* | 1/2012 | Krauss | 717/151 |
| 8,140,903 B2* | 3/2012 | Goodman et al. | 714/30 |
| 8,413,162 B1* | 4/2013 | Rozas et al. | 718/108 |
| 2002/0069399 A1* | 6/2002 | Miloushev et al. | 717/108 |
| 2002/0069400 A1* | 6/2002 | Miloushev et al. | 717/108 |
| 2002/0073063 A1* | 6/2002 | Faraj | 707/1 |
| 2002/0120924 A1* | 8/2002 | Miloushev et al. | 717/165 |
| 2003/0005263 A1* | 1/2003 | Eickemeyer et al. | 712/218 |
| 2003/0005266 A1* | 1/2003 | Akkary et al. | 712/220 |
| 2003/0061550 A1* | 3/2003 | Ng et al. | 714/45 |
| 2003/0135850 A1* | 7/2003 | Miloushev et al. | 717/165 |
| 2004/0064685 A1* | 4/2004 | Nguyen et al. | 712/227 |
| 2004/0111708 A1* | 6/2004 | Calder et al. | 717/131 |
| 2004/0216091 A1* | 10/2004 | Groeschel | 717/128 |
| 2005/0021708 A1* | 1/2005 | Raghuraman et al. | 709/223 |
| 2005/0091643 A1* | 4/2005 | Ekanadham et al. | 717/128 |
| 2005/0114844 A1 | 5/2005 | Betancourt et al. | |
| 2005/0138471 A1* | 6/2005 | Okbay et al. | 714/25 |
| 2005/0160431 A1* | 7/2005 | Srivastava et al. | 719/313 |
| 2005/0177819 A1* | 8/2005 | Ober et al. | 717/128 |
| 2005/0210454 A1* | 9/2005 | DeWitt et al. | 717/133 |
| 2005/0223366 A1* | 10/2005 | Smith et al. | 717/128 |
| 2006/0005080 A1* | 1/2006 | Walker et al. | 714/38 |
| 2006/0190930 A1* | 8/2006 | Hecht et al. | 717/128 |
| 2006/0230390 A1* | 10/2006 | Alexander et al. | 717/130 |
| 2006/0230391 A1* | 10/2006 | Alexander et al. | 717/130 |
| 2006/0282707 A1* | 12/2006 | Rosenbluth et al. | 714/38 |
| 2007/0006168 A1* | 1/2007 | Dimpsey et al. | 717/130 |
| 2007/0006171 A1* | 1/2007 | Raghunandan et al. | 717/131 |
| 2007/0067573 A1* | 3/2007 | Bruening et al. | 711/125 |
| 2008/0126003 A1* | 5/2008 | Goldstein et al. | 702/122 |
| 2008/0127110 A1* | 5/2008 | Ivanov et al. | 717/128 |
| 2008/0256396 A1* | 10/2008 | Giannini et al. | 714/45 |
| 2009/0070633 A1* | 3/2009 | Staneff | 714/45 |
| 2009/0083715 A1* | 3/2009 | DeWitt et al. | 717/128 |
| 2009/0164980 A1* | 6/2009 | Rossmann et al. | 717/128 |
| 2009/0204947 A1* | 8/2009 | Barker et al. | 717/125 |

OTHER PUBLICATIONS

Tracers: A File System to Trace Them All—Akshat Aranya, Charles P. Wright, and Erez Zadok—Stony Brook University—FAST '04 Paper—https://www.usenix.org/legacy/publications/library/proceedings/fast04/tech/full_papers/aranya/aranya_html/—2004.*

* cited by examiner

VIRAL TRACE

BACKGROUND OF THE INVENTION

1. Field of the Invention

The present application relates generally to an improved data processing apparatus and method and more specifically to an apparatus and method for performing a viral trace of the execution of a computer program.

2. Background of the Invention

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory, or perform the most I/O requests. Hardware performance tools may be built into the system or added at a later point in time. Software performance tools also are useful in data processing systems, such as personal computer systems, which typically do not contain many, if any, built-in hardware performance tools.

One known software performance tool is a trace tool. A trace tool may use more than one technique to provide trace information that indicates execution flows for an executing program. One technique keeps track of particular sequences of instructions by logging certain events as they occur, so-called event-based profiling technique. For example, a trace tool may log every entry into, and every exit from, a module, subroutine, method, function, or system component. Typically, a time-stamped record is produced for each such event. Corresponding pairs of records similar to entry-exit records also are used to trace execution of arbitrary code segments, starting and completing I/O or data transmission, and for many other events of interest.

Typically, such trace tools utilize trace hooks. A trace hook is a small portion of code that causes the execution of the software to temporarily fork to a routine that gathers data regarding the execution of the software. For example, the trace hook may cause an exception to occur which is then handled by an exception handler which invokes a trace data gathering routine. The execution may then be returned to the original software execution stream following handling of the exception. The trace data, e.g., the log of events, etc., generated by such trace tools is provided to a user to provide a view of the execution history of the software. In this way, the user may debug the software so as to obtain a desired execution of the software on the computing device.

BRIEF SUMMARY OF THE INVENTION

In one illustrative embodiment, a method, in a data processing system, is provided for performing a viral trace of a program under trace. The method may comprise associating a first viral tag with a first thread of the program under trace in a data structure. The method may further comprise spreading the first viral tag to a second thread by generating a second viral tag based on the first viral tag, the second viral tag being associated with the second thread of a program other than the program under trace. In addition, the method may comprise tracking interaction of the second thread with resources used by the first thread using the second viral tag. Moreover, the method may comprise identifying a potential source of an affect on the execution of the first thread based on the tracking of the interaction of the second thread.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

The use of trace tools typically requires that the user be aware of potential portions of the software or computer program that may have caused problems in order to focus the trace tool to the proper portion of the software or computer program. That is, for example, the user must be aware of the potential portions that may have caused problems in order to insert trace hooks at the appropriate portions of the software or computer program to capture the trace data that will enable the user to identify the problems or "bugs" in the software or computer program.

For example, if a programmer is trying to trace the root cause of a data corruption, which is typically due to the inadvertent modification of a memory location by a function within a program or another separate program, the user must take the source code of the program and add additional trace hooks or code into the running program so that the trace tool can gather additional data points. However, in some cases, when an outside program is the root cause of the corruption, placing additional trace hooks or code into the original program will not provide the necessary trace data to diagnose the root cause of the data corruption. In other words, it may not be possible to determine that the root cause of the data corruption is in a third party program external to the program being traced. As a result, the programmer may not even know to look at a third party program for the root cause of the data corruption problem.

The illustrative embodiments provide a mechanism for performing a "viral" trace of a computer program. The mechanisms of the illustrative embodiments allow tags to be proliferated from a program under trace to third party programs in a similar manner that computer viruses are spread from code to code. In addition, a limit to this ability to spread is provided that limits how deep in a hierarchy of programs the viral tag may be spread. Once the trace of the original program is completed, the spread of the viral tags may be investigated by an analysis engine to determine which third party programs were involved in the execution of the program being traced.

The mechanisms of the illustrative embodiments may be implemented in a stand alone computing system or device, a distributed data processing system, or the like. In one illustrative embodiment, the program under trace may be executing on one computing device while trace tools and/or analysis engines may be provided on a separate computing device in a distributed data processing system. In another illustrative embodiment, the program under trace may execute on the same computing system or device that also provides the trace tools and/or analysis engines. In order to provide a context for the description of the primary operational elements of the illustrative embodiments, FIGS. 1 and 2 are provided hereafter as examples of data processing environments in which the exemplary aspects of the illustrative embodiments may be provided.

Figure 1:
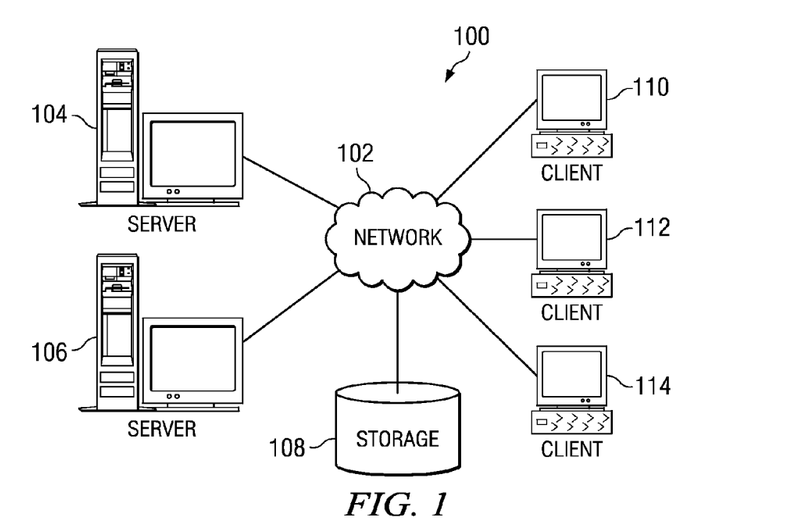
FIG. 1 is an exemplary diagram of a distributed data processing system in which exemplary aspects of the illustrative embodiments may be implemented.
Figure 2:
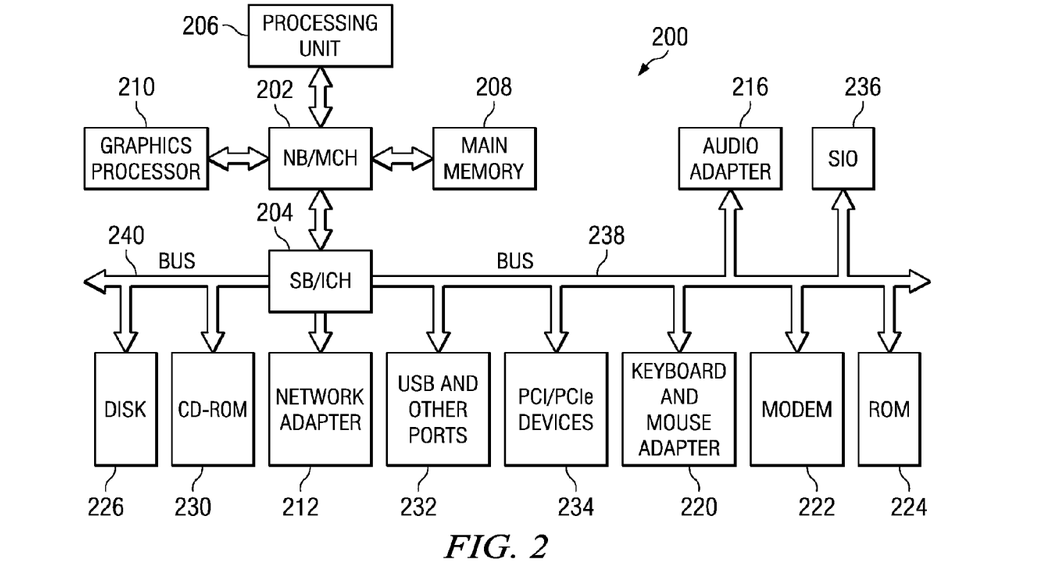
FIG. 2 is an exemplary diagram of a data processing device in which exemplary aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As discussed above, the illustrative embodiments provide a mechanism for performing a "viral" trace of a computer program. For purposes of the present description, an example of this viral trace of a computer program will be directed to tracing memory corruption or data corruption in order to exemplify how the mechanisms of the illustrative embodiments may be used to trace processes that a programmer may never have thought could possibly be related to a problem occurring during the execution of a computer program. However, this is only an example of one possible implementation of the viral trace mechanisms of the illustrative embodiment. The mechanisms of the illustrative embodiments may be applied to numerous other types of potential sources of problems in the execution of computer programs with the main emphasis being on the infective nature of the viral tags of the illustrative embodiments, and the manner by which the spread of such viral tags may be limited to ensure the usefulness of the analysis of the spread of the viral tags, as discussed in greater detail hereafter.

As mentioned above, in one illustrative embodiment data corruption is traced using the viral trace mechanism by associating a virus tag with the program under trace. This virus tag is created by a memory manager, as may be provided by an operating system kernel, or the like. When the program under trace first beings to execute, the program under trace performs a memory allocation operation to allocate a portion of memory upon which to work. When the program "touches," i.e. accesses by either reading or writing to, this portion of memory by performing a memory allocation operation on this portion of memory, the memory manager associates the virus tag with the memory locations in this portion of memory. Such association may be performed in a memory management log data structure or the like, for example. I When subsequent programs, processes, threads, or the like, "touch" the tagged memory locations, they acquire the viral tag and then spread it to other memory locations that these subsequent programs touch. The viral tag may be slightly modified, such as by decrementing an associated counter or the like, so as to identify it as being based on the original viral tag but having been acquired by another program, process, thread, or the like (hereafter collectively referred to as simply another "program"). An identifier of the other program, process, thread, etc., may be associated with the slightly modified viral tag in the memory management log data structure in a similar manner that the original program is associated with the original viral tag in the memory management log data structure. The spreading of this slightly modified viral tag may again be traced in a memory management log data structure or the like. Each time the viral tag is spread to another program, the viral tag may be slightly modified to indicate that the viral tag is now associated with another entity although is still associated with the original viral tag.

Once the trace of the original program under trace is completed, a memory management log analysis engine may analyze the memory management log to identify which locations in the allocated memory portion were "touched" by other programs, threads, processes, etc., during the execution of the program under trace. The memory locations that have a viral tag linked or associated with the original viral tag but that are modified identify a third party program, process, thread, etc. that has accessed the data in that memory location and may have potentially cause a data or memory corruption. By correlating the modified tags in the memory locations with the third party program, process, thread, etc., identifier in the memory management log data structure, it can be determined which third party programs, processes, threads, etc. accessed which memory locations in the allocated memory portion for the original program under test and may have potentially created a data or memory corruption.

In one exemplary embodiment, a history of such viral tags may be associated with each memory location so it can be determined in which order accesses to the memory locations occurred by the original program under test and third party programs, processes, threads, etc. In another illustrative embodiment, only the viral tag associated with a last access by a third party program, process, thread, or the like, to the memory location may be maintained in the memory management log data structure in association with the memory location. All other memory locations that are not touched by a third party program, process, thread, or the like, will have the original viral tag generated for the program under test by virtue of the original memory allocation operation. In still another illustrative embodiment, only the most modified viral tag, e.g., a viral tag having the lowest or highest counter value, associated with a third party program, process, thread, or the like, that touched the memory location will be maintained in the memory management log data structure in association with that memory location with all other memory locations that were not touched by a third party program, process, thread, or the like, having the original viral tag.

Although memory or data corruption, as described herein, is a prime example of tedious and difficult tracing to solve a problem, there are other examples where unknown users of a resource might need to be traced. For example, there may be situations where the serial bus of a computer appears to output random bits of data. This condition may cause resets to connected devices, such as printers and the like. Moreover, these random bits of data may cause "noise" to be detected on a serial bus. In this situation, the person debugging the problem may know that their application occasionally writes to the serial bus, however the user cannot fathom who else might be accessing the serial bus.

In this example, the user may designate their application with a first viral trace tag. When their application writes to the serial bus, their first viral trace tag is associated with the memory area used by the serial bus. Then at a later time, a third party interloper accesses the serial bus. At that time, the memory manager of the computer detects that this third party interloper is not the one that generated the first viral trace tag. Thus, the memory manager of the computer creates a second viral trace tag and associates this second tag with the new interloper thread. When this interloper thread returns to it's calling program, then the second viral trace tag is now associated with the program that generated the interloper thread. At a later time, the user can search and find the program tagged with this second viral trace tag. This may be very useful for detecting hidden viruses or Trojan horses embedded within the bowels of a computer operating system.

In addition to associating viral tags of the illustrative embodiments with applications, such viral tags may further be associated with devices or physical items connected to a computing device. These physical devices all have a memory address representation, which is how the viral trace method can be used to associate with a physical device (such as a physical serial bus).

Figure 3A:
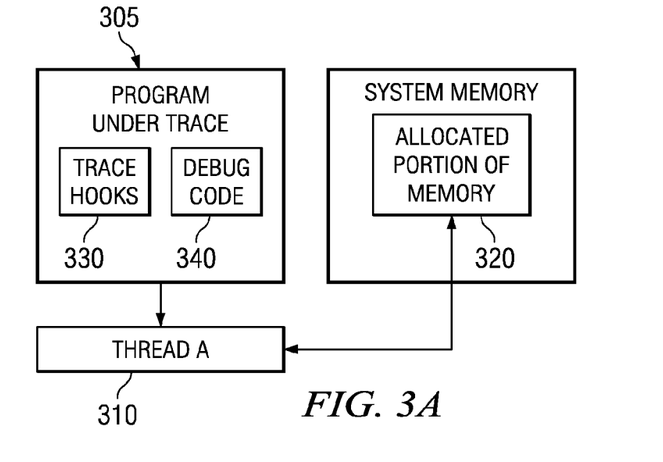
FIGS. 3A-3D are exemplary diagrams illustrating the spread of a viral tag from an original program thread to a third party program thread and the associated change in a memory management log data structure as memory locations are touched by these threads.

FIGS. 3A-3D are exemplary diagrams illustrating the spread of a viral tag from an original program thread to a third party program thread and the associated change in a memory management log data structure as memory locations are touched by these threads. As shown in FIG. 3A, assume that a program 305 is executing as Thread A 310. When this program 305 runs, occasionally some data is corrupted during its execution (illustrated by memory locations marked with a "C"). However, traces of the execution of Thread A 310 show that all the accesses that it is to perform, especially the writes, to memory locations in its allocated memory portion 320 seem to be performed correctly with no indication as to what is causing the data corruption in the allocated memory portion 320. The programmer may add trace hooks 330 and debug code 340 to the program 305 of Thread A 310, but there is no guarantee that any information may be gathered to explain the data corruption since the programmer is not aware of the portions of code to instrument with the addition of trace hooks 330 and debug code 340 and furthermore, since in this example, the source of the corruption does not lie within Thread A 310 but in a third party program, processor, thread, etc.

With the illustrative embodiments, Thread A 310 initially makes a call, e.g., a vmode call, to a memory manager 350, such as may be provided by or in association with an operating system, which is equipped with logic for performing a viral mode of operation. Thread A 310 requests that the memory manager 350 enter the viral mode of operation in which the memory manager 350 assigns a viral tag 360 with Thread A 310 and monitors the proliferation of the viral tag 360 in a viral manner from Thread A 310 to other threads of other processes or programs. The request from Thread A 310 to the memory manager 350 may specify a viral level or depth of spreading the viral tag 360, e.g., a viral level of 3. Alternatively, the viral level or depth may be pre-set in a configuration file or other data structure (not shown) specifying configuration information for configuring the memory manager 350 to perform the viral mode of operation.

Figure 3B:
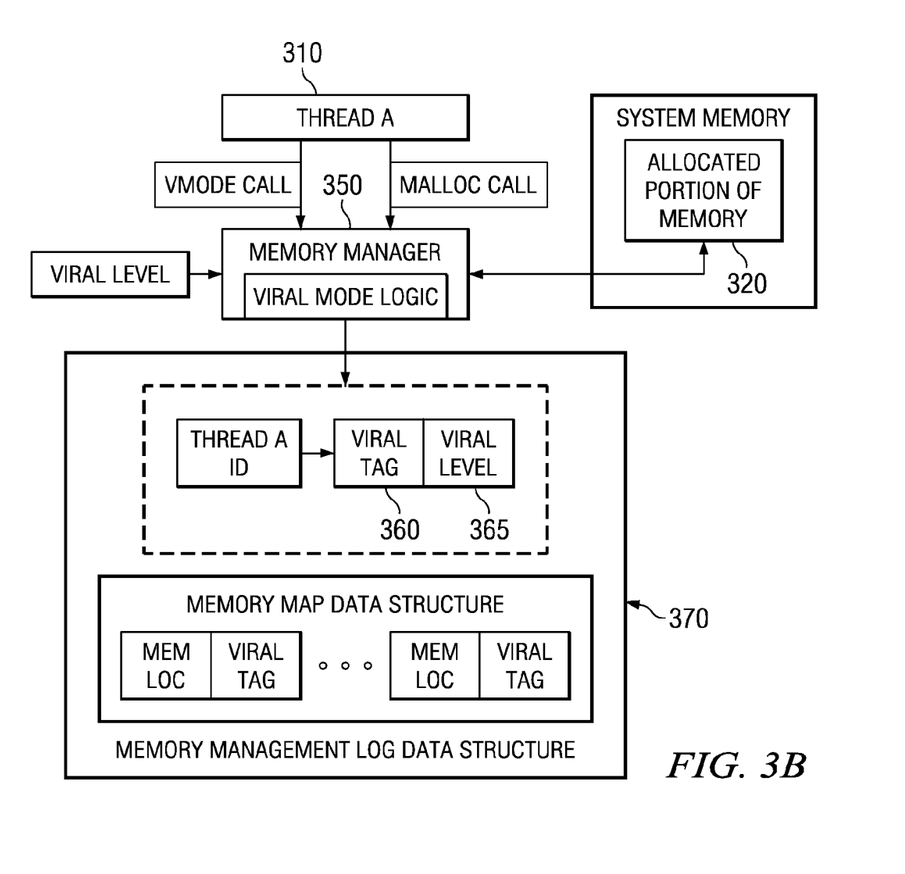

As shown in FIG. 3B, in response to the call from Thread A 310 to the memory manager 350 that invokes the viral mode of operation, the memory manager 350 allocates a viral tag 360 and associates it with an identifier of Thread A 310 in a memory management log data structure 370. The association of viral tags with particular threads may be performed by memory manager 350 using a tracking table for threads which may be maintained in a separate data structure or as part of the memory management log data structure, for example. This tracking table may maintain information about each viral tag associated with each thread. Thus, multiple viral tags may be associated with the same thread as these viral tags are modified, as discussed in greater detail hereafter. Alternatively, as described hereafter, a single viral tag may be associated with each thread with modifications of viral tags being rolled back when the memory management log data structure is being examined in order to correlate viral tags with threads.

The viral tag 360 has a viral level parameter 365 associated with it having an initial value dependent upon the specified or pre-set viral level or depth. In one illustrative embodiment, the viral tag 360 may have a viral level parameter 365 that is a self decrementing or incrementing counter that is set to an initial value based on the viral level or depth. In the depicted example, the tag "VA" stands for the viral tag 360 for Thread A 310 with the numerical value "3" representing the initial viral level or depth parameter 365 of the viral tag 360.

Having generated a viral tag 360 and associated it with an identifier of Thread A 310 in the memory management log data structure 370, Thread A 310 is permitted to execute and be traced by trace tools in a manner generally known in the art. In addition, the mechanisms of the illustrative embodiment track the touches that Thread A 310 performs to memory locations as well as other threads that may touch an allocated memory location for Thread A 310 during the trace.

Figure 3C:
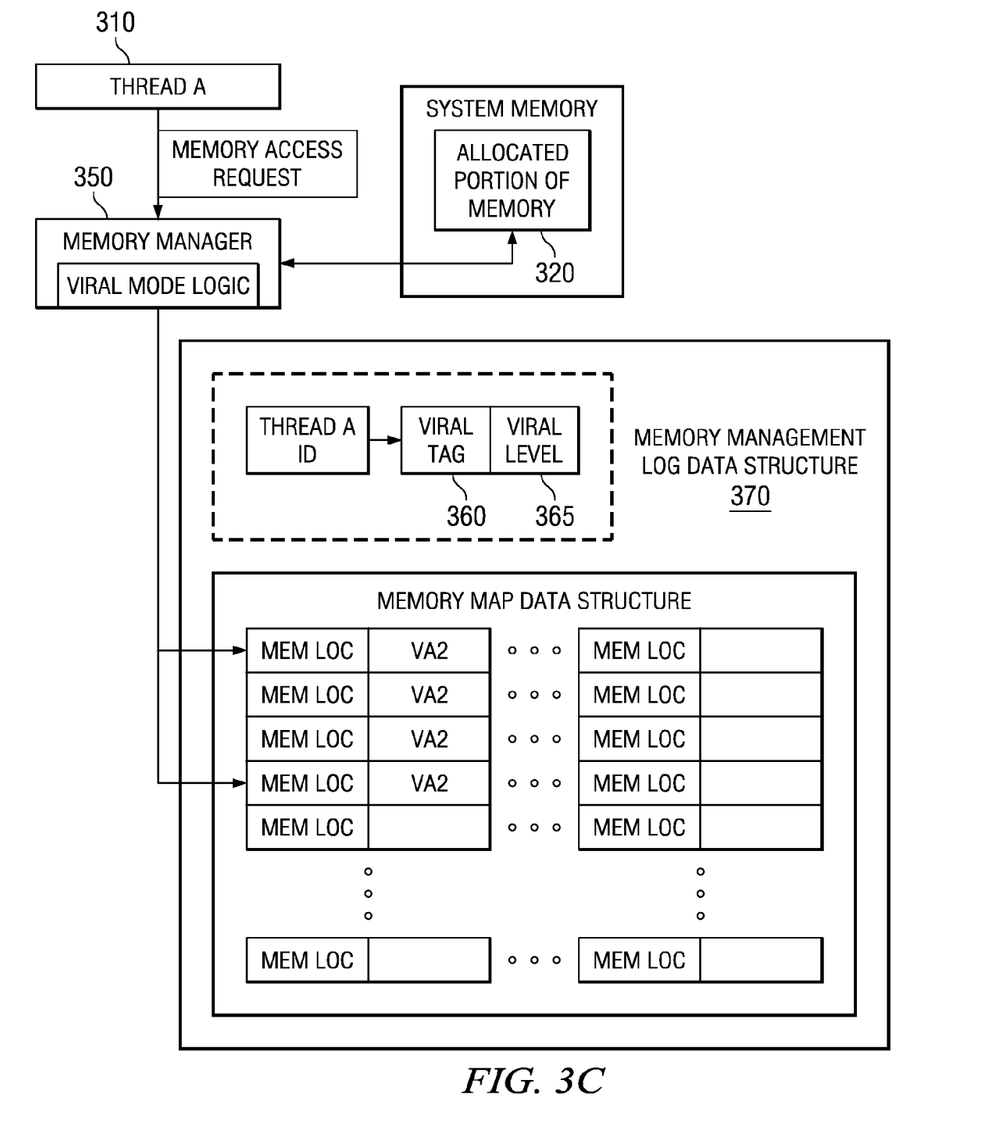

Initially, Thread A 310 performs a memory allocation operation by performing a memory allocation call to the memory manager 350 requesting a portion of memory for Thread A 310 to work on. For example, Thread A 310 may perform a malloc call to the memory manager 350. Having allocated a portion of memory 320 for use by Thread A 310, when Thread A 310 "touches," i.e. accesses, memory locations in the portion of memory allocated to Thread A 310 by the memory manager 350, the memory manager 350 associates with the touched memory locations the viral tag 360 in the memory management log data structure 370. For example, as shown in FIG. 3C, when Thread A 310 "touches" a block of memory within the allocated memory portion 320 the viral level parameter 365 associated with the viral tag 360 is decremented from "3" to "2" and the modified viral tag 368 is associated with the block of memory in the memory management log data structure 370.

When subsequent "touches" to the allocated memory portion 320 occur, threads performing such touches will pick up the viral tag associated with the block of memory being touched and will spread that viral tag to other portions of system memory including the allocated memory portion 320 and other portions of memory outside the allocated memory portion 320. With each touch to the memory by a different thread, the viral tag is modified so as to limit the spread of the viral tag throughout the system. Thus, if a thread encounters a viral tag associated with a memory location that is being touched by that thread, and the viral tag cannot be further modified based on the viral level limits imposed by the viral limit or depth specified in the configuration file of the memory manager 350 or specified in the original request for the memory manager 350 to enter viral mode, then that viral tag is not picked up by the thread and spread to other memory locations.

If the original thread with which the allocated memory portion 320 is associated, e.g., Thread A 310, were to touch a memory location that has already been touched by another thread, e.g., Thread B 380 described hereafter, then the viral tag associated with that memory location is not modified. However, the memory manager 350 will note this conflict in the memory management log data structure 370. After the trace of the program execution is complete, or when the trace and/or viral mode of operation is terminated, a trace tool or other analysis engine may access the memory management log data structure 370 and may determine that Thread A 310 visited a memory location that had been touched or accessed by another thread, e.g., Thread B 380. It is known that Thread A 310 is the only thread that is supposed to be touching or accessing this memory location and the presence of a viral tag there associated with another thread indicates that this may be the point at which data corruption occurred during execution of the program under trace.

Figure 3D:
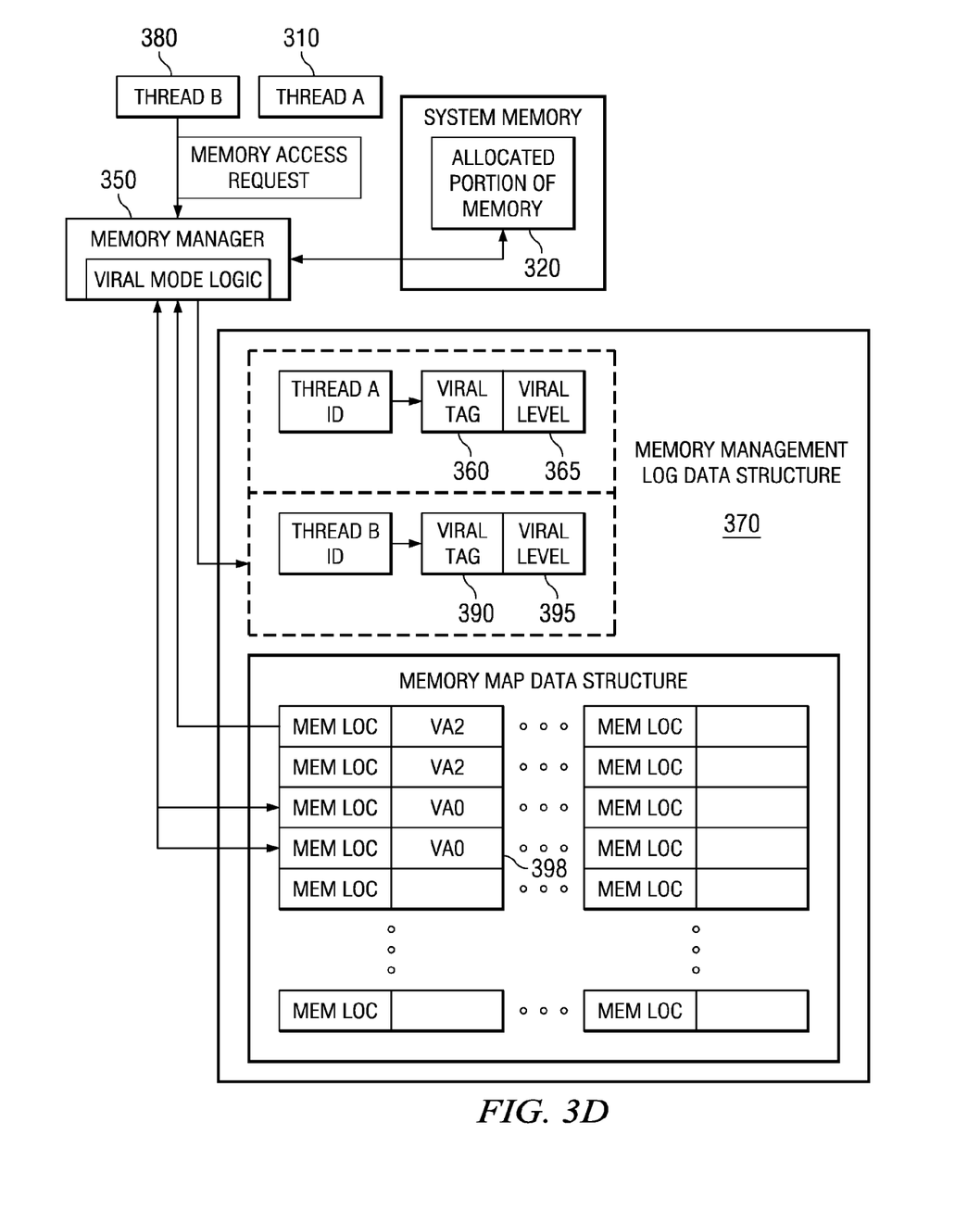

FIG. 3D illustrates an example in which a second thread, Thread B 380, unbeknownst to Thread A 310, touches a memory location within the allocated memory portion 320. In this example, Thread B 380 is a rogue program that is the source of the memory corruption problem mentioned above. Because of faulty logic, for example, Thread B 380 may wake up at inappropriate times and touch one or more memory locations within the allocated memory portion 320 and perform a write operation on those memory locations thereby changing the data stored therein. This is what causes Thread A's 310 memory corruption problem.

Assume that a memory location within the allocated memory portion 320 has been touched by Thread A 310 and thus, has an associated viral tag 360 of "VA2" associated with it, as described previously. When Thread B 380 touches this memory location within the allocated memory portion 320, the memory manager 350 logic essentially causes Thread B 380 to "pick up" the viral tag 360. Since Thread B 380 has never had the virus tag 360 before, the viral tag 360 is modified, e.g., by incrementing or decrementing the viral tag's viral level parameter 365, and the modified viral tag 390 is associated with an identifier of Thread B 380 in the memory management log data structure 370. The determination of whether Thread B 380 has had the viral tag 360 before or not may be made by comparing an identifier of Thread B 380 against thread identifiers stored in the memory management log data structure 370, for example, and determining if there is an entry for Thread B 380. In the depicted example, Thread B 380 has not previously had the viral tag 360 and thus, the viral tag 360 having a value of "VA2" is decremented to "VA1" which is then associated with Thread B 380 in the memory management log data structure 370.

When Thread B 380 touches a different memory location, the viral tag 390 is again modified, such as by changing the viral level parameter 395, e.g., by decrementing the viral level parameter 395 from a "1" value to a "0" value, and the modified viral tag 398 is associated with that memory location in the memory management log data structure 370. Since the viral tag 398 is at a minimum viral level, e.g., level "0," it can no longer be modified by subsequent threads, e.g., a Thread C, that touches this memory location. Thus, for example, if a Thread C were to touch the memory location having an associated viral tag 398 of "VA0", then Thread C would not pick up the viral tag 398 and thus, subsequent spread of the viral tag 360 is prohibited. This is a way of limiting the "contamination" of the viral tag 360 so that the entire operating system is not considered "infected" by the viral tag 360 and as a result, when the spread of the viral tag 360 is analyzed after the trace, meaningful data regarding probable sources of data corruption may be extracted, i.e. what other programs, processes, threads, etc. to instrument to determine the cause of the data corruption.

When the program of Thread A 310 runs to completion, or when the trace of program of Thread A 310 is terminated, the viral tags 360, 390, and 398 are maintained in the memory management log data structure 370. The trace tool may be run on the memory management log with logic for extracting information associated with viral tags matching the viral tag 360 with any viral level or depth parameter value, e.g., extracting information regarding entries associated with viral tag "VA*" (any VA viral level). This information will thus, identify the memory locations that were touched by Thread A 310 as well as any other thread, e.g., Thread B 380, up to the specified maximum or minimum viral level. Thus, those memory locations in the allocated memory portion 320 that were touched by Thread A 310 will be designated by a viral tag of "VA2" while those memory locations touched by Thread B 380 will be designated with a viral tag of "VA0." In correlating these memory location viral tags with the actual identifiers of the threads, the viral tags may be incremented, or decremented in a different embodiment, by 1 to generate the viral tags "VA3" and "VA1" which are associated with the identifiers of Thread A 310 and Thread B 380, respectively, in the memory management log data structure 370.

Thus, the mechanisms of the illustrative embodiments provide additional information, in the depicted example, that Thread B 380 was awoken and touched memory locations within the portion of memory 320 allocated to Thread A 310 while Thread A 310 was executing and under trace. Hence, a programmer looking at this information will be made aware that Thread B 380 needs to be investigated to determine if and why Thread B 380 caused the data corruption experienced by Thread A 310. In known tracing tools, such information is not available since there is no mechanism for identifying other programs, processes, threads, etc. that are not the subject of the trace that affect the outcome of the trace while the program under trace is executing. For example, known tracing tools do not provide an ability to identify which third party programs, processes, threads, etc., have touched which memory locations of a portion of memory allocated to a program under trace.

It should be appreciated that the viral tag methodology discussed above is only exemplary of one possible implementation of the present invention. Many other ways of implementing a viral tag with a limited scope of contamination, or range of proliferation, may be used without departing from the spirit and scope of the illustrative embodiments or the present invention. As one other example, rather than decrementing or incrementing the viral level parameter each time a new thread acquires the viral tag and touches a memory location after having acquired the viral tag, the viral tag modifications may be performed only when a new thread accesses a memory location in the allocated portion of memory 320 and has not been previously associated with a viral tag. Thus, for example, Thread A 310 may start with an associated viral tag of VA3 and memory locations touched or accessed by Thread A 310 will have the viral tag VA3 associated with them. When Thread B 380 is encountered in the above example, the viral tag VA3 is decremented by the memory manager 350 to a viral tag of VA2 and thus, memory locations touched or accessed by Thread B 380 have the viral tag VA2 associated with them. However, in this example, since the viral level or depth is "3", a Thread C (viral tag VA1) and a Thread D (viral tag VA0) would also be permitted to have associated viral tags stemming from viral tag VA3. Thus, instead of only two threads being tracked using the mechanisms of the illustrative embodiments, with a viral level of "3", this alternative embodiment may track 4 different threads. If only two threads were intended to be tracked, then the viral level may be reset to "1" initially and thus, Thread A 310 would have a viral tag of VA1 and Thread B 380 would have a viral tag of VA0.

In operation, in this alternative illustrative embodiment, the memory manager 350 may associate an initial viral tag 360 with the Thread A 310 in the manner discussed above with regard to the previous illustrative embodiment. Thus, the memory management log data structure 370 may store an association of an identifier of Thread A 310 with the viral tag 360 having a value of "VA3." When the Thread B 380 touches a memory location in the allocated memory portion 320, the identifier of Thread B 380 is compared against identifiers of threads that have had a viral tag associated with them in the memory management log data structure 370. In other words, the identifier of Thread B 380 is compared to the identifiers of threads in the memory management log data structure 370 and if Thread B's identifier is matched, then its associated viral tag is retrieved from the memory management log data structure 370. Otherwise, if the identifier of Thread B 380 is not matched in the memory management log data structure 370, then a new viral tag may be generated from the viral tag of the thread with which the allocated memory portion 320 is associated, i.e. Thread A's viral tag 360.

If Thread B 380 has already been encountered and thus, has a viral tag associated with it, then Thread B's 380 viral tag is extracted and associated with an entry in the memory management log data structure 370 for the memory location touched by Thread B 380. If Thread B 380 does not already have an associated viral tag, then the modified viral tag 390 is generated based on the viral tag 360 associated with the thread to which the allocated memory portion 320 is allocated, i.e. Thread A 310.

The modified viral tag 390 may have a viral level parameter 395 corresponding to a modified value, such as a next decremented or incremented value. In the case of a self decrementing counter being used for the viral level parameter 395, the viral level parameter 395 cannot be decremented below a minimum value, e.g., 1 or 0. For a self incrementing counter being used for the viral level parameter 395, the viral level parameter 395 cannot be incremented above a maximum value, e.g., the viral level set in the configuration file, input by the original call to initiate the viral mode, etc. In this way, the spread of the viral tag 360 may be limited to the viral level specified in the configuration file or input by the original call to initiate the viral mode of operation in the memory manager 350. If the viral tag 360 cannot be modified further, such as by incrementing or decrementing the viral level parameter, for example, then a modified viral tag may not be associated with the thread that is touching the allocated memory location 320. Again, this limitation is to avoid having too many programs, processes, threads, etc. being included in the viral tracing of the present invention and thereby rendering the results unuseable by having too many potential causes of data corruption to investigate.

In one illustrative embodiment, the memory manager 350 may maintain information about the current highest or lowest viral level, depending upon the implementation, associated with that viral tag 360. Thus, for example, if the viral tag's viral level parameter has been previously decremented from VA3 to a VA2 in association with a touching of the allocated portion of memory 320 by another thread, then the lowest viral level associated with viral tag 360 is a viral level of "2". As a result, the new viral tag generated for Thread B 380 would have a viral level of "1" by decrementing the lowest viral level associated with viral tag 360. This may be accomplished by using a counter, for example, as mentioned above.

In the depicted example, no previous thread has touched a memory location in the allocated memory portion 320 other than Thread A 310 and thus, the new viral tag generated for Thread B 380 is a viral tag of VA2 (one less than VA3). The association of an identifier of Thread B 380 with the new viral tag VA2 is maintained in the memory management log data structure 370 and any memory locations touched by Thread B 380 from there on will have the associated new viral tag VA2 associated with them in the memory management log data structure 370.

For example, when Thread B 380 touches a memory location within the allocated memory portion 320, the memory manager 350 checks the identifier of Thread B against identifiers of threads that have had a viral tag associated with them in the memory management log data structure 370. If Thread B 380 has already been encountered and thus, has a viral tag associated with it, then Thread B's 380 viral tag is associated with an entry in the memory management log data structure 370 for the memory location touched by Thread B 380. If Thread B 380 does not already have an associated viral tag, then a modified viral tag 390 is generated based on the viral tag 360 associated with the thread to which the allocated memory portion 320 is allocated, i.e. Thread A 310, if further modification of the viral tag is permitted, e.g., a number of modifications has not exceeded a pre-established limit on modifications of the viral tag.

The modified viral tag 390 may have a viral level parameter 395 corresponding to a modified value, such as a next decremented or incremented value. In the case of a self decrementing counter being used for the viral level parameter 395, the viral level parameter 395 cannot be decremented below a minimum value, e.g., 1 or 0. For a self incrementing counter being used for the viral level parameter 395, the viral level parameter 395 cannot be incremented above a maximum value, e.g., the viral level set in the configuration file, input by the original call to initiate the viral mode, etc. In this way, the spread of the viral tag 360 may be limited to the viral level specified in the configuration file or input by the original call to initiate the viral mode of operation in the memory manager 350. If the viral tag 360 cannot be modified further, such as by incrementing or decrementing the viral level parameter, for example, then a modified viral tag may not be associated with the thread that is touching the allocated memory location 320. This limitation is to avoid having too many programs, processes, threads, etc. being included in the viral tracing of the present invention and thereby rendering the results unuseable by having too many potential causes of data corruption to investigate.

Thus, in this alternative illustrative embodiment, the incrementing and decrementing of the viral tag viral level parameter 365 is managed by the memory manager 350 and when the memory manager 350 receives an access request to access a memory location, the memory manager correlates a thread identifier of the request with a thread identifier in the memory management log data structure 370 and associates the corresponding viral tag with the memory location being accessed or touched by the thread. If the thread does not have an associated viral tag, then one is generated for it by modifying the existing viral tag, assuming that the viral tag may be further modified without exceeding a designated limit on modifications to the viral tag.

In some illustrative embodiments, the association of viral tags with entries in the memory management log data structure for each memory location may store only the viral tag of the last thread, program, process, etc., that touched the memory location. In other illustrative embodiments, each entry may maintain a history of the viral tags of the threads, processes, programs, etc. that touched that memory location in order of the touches or accesses.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
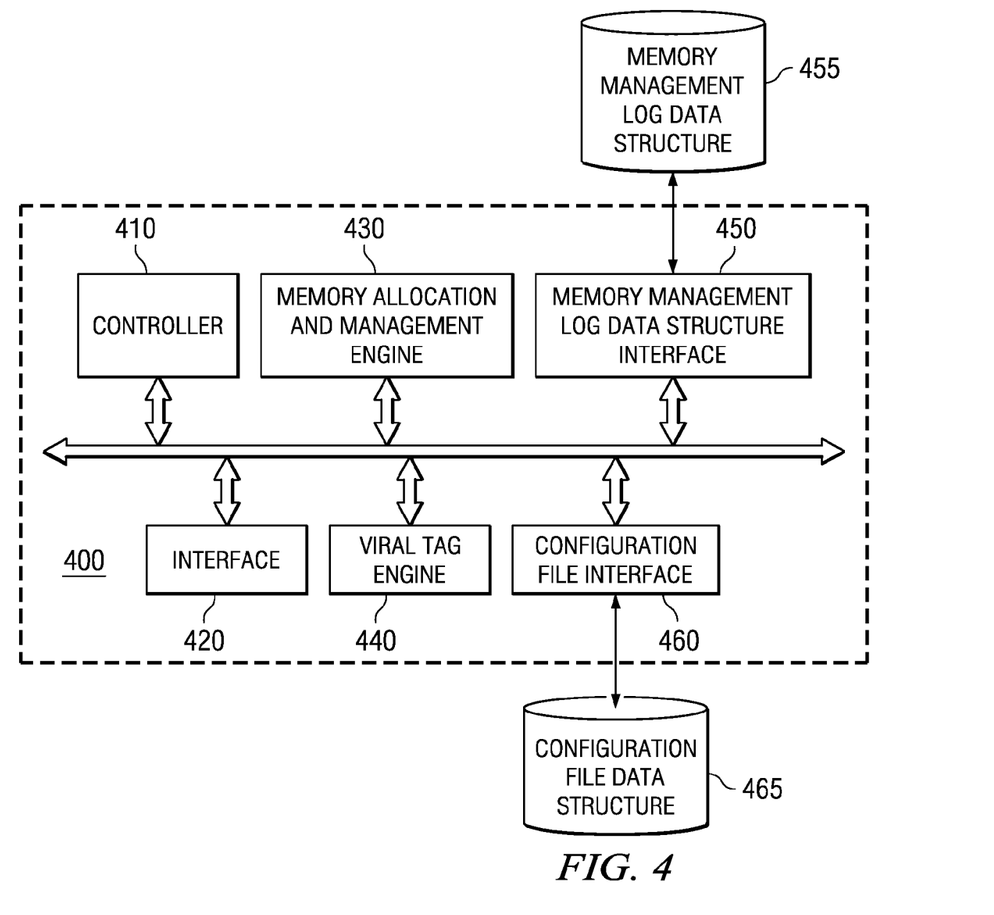
FIG. 4 is an exemplary block diagram of a memory manager in accordance with one illustrative embodiment.

Referring now to FIG. 4, an exemplary block diagram of a memory manager in accordance with one illustrative embodiment is provided. The elements shown in FIG. 4 may be implemented in hardware, software, or any combination of hardware and software on one or more processors in one or more data processing systems. For purposes of illustration, it will be assumed that the elements in FIG. 4 are implemented as software instructions executed by one or more processors on a single data processing system.

As shown in FIG. 4, the memory manager 400 includes a controller 410, an interface 420, a memory allocation and management engine 430, a viral tag engine 440, a memory management log data structure interface 450, and a configuration file interface 460. The controller 410 controls the overall operation of the memory manager 400 and orchestrates the operation of the other elements 420-460. The interface 420 provides a communication mechanism through which data and commands may be passed. For example, requests to enter a viral mode of operation may be received via the interface 420, memory access requests may be received from threads via the interface 420, the memory management log data structure may be accessed via the interface 420, and the like.

The memory allocation and management engine 430 provides logic for allocating portions of memory to programs, processes, threads, or the like. In addition, the memory allocation and management engine 430 manages accesses to the portions of memory based on access requests received via the interface 420. For example, as discussed above, when a thread initiates, the thread may make a call to the memory manager 400 requesting that a portion of memory be allocated for use by the thread, e.g., a malloc operation call may be performed to the memory manager 400. This call may be handled by the memory allocation and management engine 430 which allocates a portion of memory for use by the thread and manages accesses to that portion of memory.

The viral tag engine 440 has logic for performing the various operations for generating viral tags, managing the modifications to viral tags, and storing/accessing information in the memory management log data structure associated with viral tags. The viral tag engine 440 may generate viral tags and associate them with identifiers of threads in the memory management log data structure, store viral tag information in association with entries for memory locations of an allocated portion of memory, and store information regarding current viral levels of viral tags for use in generating modified viral tags, for example. The viral tag engine 440 provides the logic for performing the various operations of the memory manager 400 of the illustrative embodiments, under the control of the controller 410, discussed above that are not specifically attributed to another element in FIG. 4.

The memory management log data structure interface 450 provides a communication pathway through which data may be stored to, and data may be retrieved from, the memory management log data structure 455. For example, the viral tag engine 440 may store data in the memory management log data structure 455 representing an association between a thread identifier and a viral tag, data associating viral tags with memory locations, data representative of a current viral level of a viral tag, and the like. This data may further be accessed by the viral tag engine 440 and a trace tool through this interface 450 and the memory manager interface 420.

The configuration file interface 460 provides a communication pathway for accessing a configuration file 465 that specifies a viral level for viral tags generated by the viral tag engine 440. The viral tag engine 440, when initiating a viral mode of operation, may generate a new viral tag having an associated viral level parameter determined based on the viral level specified in the configuration file 465. Alternatively, as mentioned above, the viral level may be specified in a request received via the interface 420. The elements 410-460 may operate in concert with one another to perform the various operations outlined previously above to implement the viral tags and control the proliferation or spread of the viral tags from thread to thread, program to program, process to process, or the like.

Figure 5:
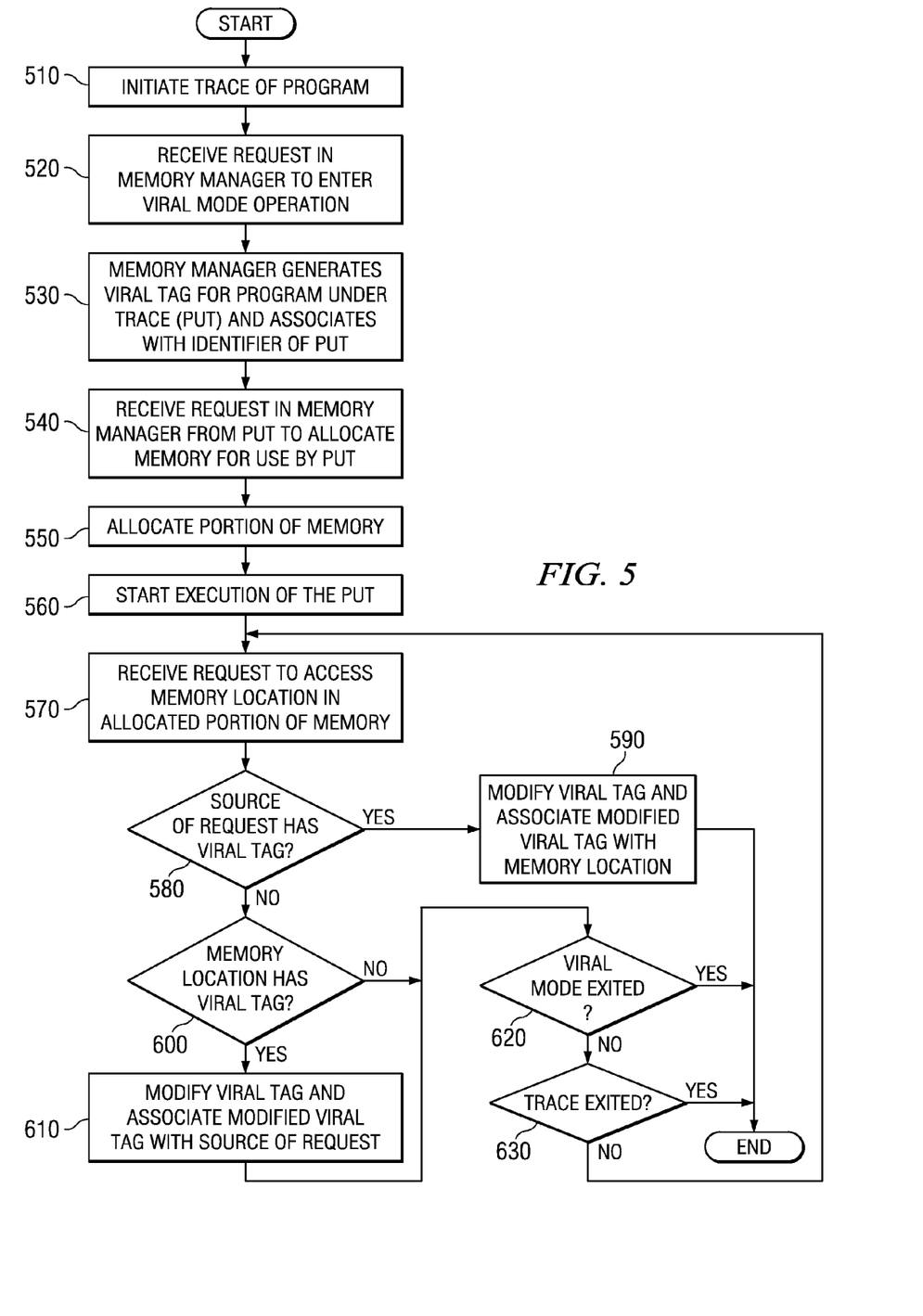
FIG. 5 is a flowchart outlining an exemplary operation for implementing viral tags during tracing of the execution of a computer program.

FIG. 5 is a flowchart outlining an exemplary operation for implementing viral tags during tracing of the execution of a computer program. As shown in FIG. 5, the operation starts with the initiation of a trace of the execution of a program by a trace tool (step 510). A request is received, in a memory manager from the trace tool, to enter viral mode of operation (step 520). The memory manager generates a viral tag for the program under trace and associates it with an identifier of the program in a memory management log data structure (step 530).

A request is received, in a memory manager from the program under trace, to allocate a portion of memory for use by the program (step 540). The portion of memory is allocated (step 550) and the execution of the program is started (step 560). A request to access a memory location within the allocated memory portion is received (step 570). A determination is made as to whether the thread, program, processor, or the like, has an associated viral tag (step 580). If the thread, program, processor, or the like has a viral tag, then the viral tag is modified and the modified viral tag is associated with the memory location (step 590).

If the thread, program, processor, or the like does not have a viral tag, a determination is made as to whether the memory location has an associated viral tag (step 600). If the memory location has a viral tag associated with it, the viral tag is modified and the modified viral tag is associated with the thread, program, processor, or the like, accessing the memory location (step 610). Thereafter, or if the memory location does not have a viral tag, and the thread, program, process, or the like does not have a viral tag, the operation determines if the viral mode of operation has been exited (step 620). If so, the operation terminates. If not, the operation determines if the trace of the program has exited (step 630). If so, the operation terminates. If not, the operation returns to step 570 in response to a request to access a memory location in the allocated memory portion.

The information maintained in the memory management log data structure with regard to the viral tags may then be extracted by the trace tool and provided to a user or another analysis tool. The user or other analysis tool may identify third party threads, programs, processes, or the like, that touch or access memory locations within an allocated memory portion and thus, may be a source of data corruption within the allocated memory portion based on the extracted viral tag information from the memory management log data structure. Based on the identification of a third party thread, program, process, or the like, that may be the source of data corruption, steps may be taken to instrument this third party entity with debug code or trace hooks so as to determine the actual cause of the data corruption within this third party entity.

Thus, the illustrative embodiments provide mechanisms for performing viral traces of programs, threads, processes, or the like that are third party to the program, thread, process, etc. under trace. The viral trace of the illustrative embodiments allow information about third party intervention in the operation of the program, thread, process, or the like, under trace such that a potential unwanted affect on the operation of the entity under trace may be investigated and solved.

While the above illustrative embodiments, are described in terms of the viral tag being modified to a specified limit with further modifications to the viral tags being inhibited, other mechanisms may utilize the modification of viral tags as a trigger for performing other special functions of a trace. For example, in one illustrative embodiment, if the viral tag of the original thread with which an allocated portion of memory is associated is modified to or beyond a threshold, e.g., below a value of 0, then it may be determined that the viral tags are being spread at a much faster rate than expected. As a result, a forced system dump may be performed in order to generate a "snapshot" of the latest viral tag spread. Other functions may be triggered by the modification of the viral tag to or beyond a threshold without departing from the spirit and scope of the present invention.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing a viral trace of a program under trace, comprising:
associating a first viral tag with a first thread of the program under trace in a data structure;
spreading the first viral tag to a second thread by generating a second viral tag based on the first viral tag, the second viral tag being associated with the second thread of another program, different than the program under trace, and not a subject of a trace of the program under trace, wherein the second thread is a different thread than the first thread;
tracking interaction of the second thread with resources used by the first thread using the second viral tag; and
identifying a potential source of an effect on the execution of the first thread based on the tracking of the interaction of the second thread.

2. The method of claim 1, wherein the resources are memory locations within an allocated portion of system memory, the allocated portion of system memory being allocated for use by the first thread.

3. The method of claim 2, wherein tracking interaction of the second thread with resources used by the first thread using the second viral tag comprises associating the second viral tag with memory locations accessed by the second thread in a memory management log data structure.

4. The method of claim 3, wherein identifying a potential source of an effect on the execution of the first thread comprises:
analyzing viral tags associated with memory locations in the memory management log data structure to identify which memory locations, within the allocated portion of system memory, were accessed by a thread different from the first thread;
identifying one or more threads different from the first thread that accessed memory locations within the allocated portion of system memory; and
outputting an identification of the one or more threads as a potential source of an effect on the execution of the first thread.

5. The method of claim 1, wherein associating a first viral tag with a first thread of the program under trace in a data structure comprises:
generating, by a memory manager, the first viral tag and an associated first viral level parameter; and
storing the first viral tag and associated first viral level parameter in the data structure in association with an identifier of the first thread.

6. The method of claim 5, wherein the first viral level parameter is generated based on a viral level limit parameter input to the memory manager, wherein the viral level limit parameter specifies a limit on the spreading of the first viral tag to other threads.

7. The method of claim 5, wherein spreading the first viral tag to a second thread by generating a second viral tag based on the first viral tag comprises:
modifying the viral level parameter associated with the first viral tag to thereby generate a second viral level parameter; and
generating a second viral tag based on a combination of the first viral tag and the second viral level parameter.

8. The method of claim 1, wherein generating the second viral tag is performed in response to the second thread accessing a resource with which the first viral tag is associated.

9. The method of claim 1, wherein tracking interaction of the second thread with resources used by the first thread using the second viral tag comprises:
storing, in the data structure, a third viral tag generated based on the second viral tag in association with each resource accessed by the second thread.

10. The method of claim 9, wherein tracking interaction of the second thread with resources further comprises:
maintaining, in the data structure, in association with each memory location of the allocated portion of system memory, a history of viral tags of threads that have accessed the memory location during the viral trace of the program under trace.

11. A computer program product comprising a non-transitory computer recordable medium having a computer readable program recorded thereon, wherein the computer readable program, when executed on a computing device, causes the computing device to:

associate a first viral tag with a first thread of the program under trace in a data structure;

spread the first viral tag to a second thread by generating a second viral tag based on the first viral tag, the second viral tag being associated with the second thread of another program, different than the program under trace, and not a subject of a trace of the program under trace, wherein the second thread is a different thread than the first thread;

track interaction of the second thread with resources used by the first thread using the second viral tag; and     identify a potential source of an effect on the execution of the first thread based on the tracking of the interaction of the second thread.

12. The computer program product of claim 11, wherein the resources are memory locations within an allocated portion of system memory, the allocated portion of system memory being allocated for use by the first thread.

13. The computer program product of claim 12, wherein the computer readable program causes the computing device to track interaction of the second thread with resources used by the first thread using the second viral tag by associating the second viral tag with memory locations accessed by the second thread in a memory management log data structure.

14. The computer program product of claim 13, wherein the computer readable program causes the computing device to identify a potential source of an effect on the execution of the first thread by:

analyzing viral tags associated with memory locations in the memory management log data structure to identify which memory locations, within the allocated portion of system memory, were accessed by a thread different from the first thread;

identifying one or more threads different from the first thread that accessed memory locations within the allocated portion of system memory; and     outputting an identification of the one or more threads as a potential source of an effect on the execution of the first thread.

15. The computer program product of claim 11, wherein the computer readable program causes the computing device to associate a first viral tag with a first thread of the program under trace in a data structure by:

generating, by a memory manager, the first viral tag and an associated first viral level parameter; and     storing the first viral tag and associated first viral level parameter in the data structure in association with an identifier of the first thread.

16. The computer program product of claim 15, wherein the first viral level parameter is generated based on a viral level limit parameter input to the memory manager, wherein the viral level limit parameter specifies a limit on the spreading of the first viral tag to other threads.

17. The computer program product of claim 15, wherein the computer readable program causes the computing device to spread the first viral tag to a second thread by generating a second viral tag based on the first viral tag by:

modifying the viral level parameter associated with the first viral tag to thereby generate a second viral level parameter; and     generating a second viral tag based on a combination of the first viral tag and the second viral level parameter.

18. The computer program product of claim 11, wherein the computer readable program causes the computing device to generate the second viral tag in response to the second thread accessing a resource with which the first viral tag is associated.

19. The computer program product of claim 11, wherein the computer readable program causes the computing device to track interaction of the second thread with resources used by the first thread using the second viral tag by:

storing, in the data structure, a third viral tag generated based on the second viral tag in association with each resource accessed by the second thread.

20. The computer program product of claim 19, wherein the computer readable program causes the computing device to track interaction of the second thread with resources further by:

maintaining, in the data structure, in association with each memory location of the allocated portion of system memory, a history of viral tags of threads that have accessed the memory location during the a viral trace of the program under trace.

21. An apparatus, comprising:

a processor; and a memory coupled to the processor, wherein the memory comprises instructions which, when executed by the processor, cause the processor to:

associate a first viral tag with a first thread of the program under trace in a data structure;

spread the first viral tag to a second thread by generating a second viral tag based on the first viral tag, the second viral tag being associated with the second thread of another program, different than the program under trace, and not a subject of a trace of the program under trace, wherein the second thread is a different thread than the first thread;

track interaction of the second thread with resources used by the first thread using the second viral tag; and     identify a potential source of an effect on the execution of the first thread based on the tracking of the interaction of the second thread.

\* \* \* \* \*